US008572554B2

(12) United States Patent
Yao et al.

(10) Patent No.: US 8,572,554 B2
(45) Date of Patent: Oct. 29, 2013

(54) METHOD AND SYSTEM FOR INTEGRATING JAVA AND JAVASCRIPT TECHNOLOGIES

(75) Inventors: Yitao Yao, Saratoga, CA (US); Mark P. Palaima, Saratoga, CA (US); Pei Wang, Saratoga, CA (US); Gregory Choi, San Jose, CA (US); Justin Christopher Early, Portland, OR (US); Sathishwar Pottavathini, San Jose, CA (US)

(73) Assignee: eBay Inc., San Jose, CA (US)

( * ) Notice: Subject to any disclaimer, the term of this patent is extended or adjusted under 35 U.S.C. 154(b) by 1106 days.

(21) Appl. No.: 12/505,406

(22) Filed: Jul. 17, 2009

(65) Prior Publication Data

US 2011/0016449 A1 Jan. 20, 2011

(51) Int. Cl.
*G06F 9/44* (2006.01)

(52) U.S. Cl.
USPC .......................................................... 717/106

(58) Field of Classification Search
USPC .................................................. 717/100–167
See application file for complete search history.

(56) References Cited

U.S. PATENT DOCUMENTS

| 6,898,786 | B1 * | 5/2005 | Sokolov | 717/139 |
|---|---|---|---|---|
| 7,062,772 | B2 * | 6/2006 | Underseth et al. | 719/328 |
| 7,373,632 | B1 * | 5/2008 | Kawaguchi et al. | 717/100 |
| 2004/0158843 | A1 * | 8/2004 | Cloccarelli | 719/330 |
| 2005/0034104 | A1 * | 2/2005 | Pugh et al. | 717/124 |

OTHER PUBLICATIONS

Javascript Syntax, Jun. 30, 2008, Wikipedia.*

* cited by examiner

*Primary Examiner* — Anna Deng
(74) *Attorney, Agent, or Firm* — Schwegman Lundberg & Woessner, P.A.

(57) ABSTRACT

A method and system for integrating Java and JavaScript technologies is provided. An example system includes a JavaScript proxy generator and a runtime module. The JavaScript proxy generator may be configured to automatically generate a JavaScript proxy in a form of a Java application programming interface. The runtime module may be configured to call the JavaScript proxy from the Java module, pass control of execution to the JavaScript module, execute the JavaScript module to generate an output method or object, and pass control of execution to the Java module to continue execution of the Java module.

18 Claims, 10 Drawing Sheets

```
//import com.ebay.dsf.dap.proxy.Array;// Proxy to JavaScript native array
//...
Array jsArr = new Array("abc", 123, 14.5);
for (Object val : jsArr) {
    System.out.println(val);
}
```
602

```
var jsArr=["abc",123,14.5];
for (var val in jsArr){
    this.vj$.System.out.println(val);
}
```
604

*FIG. 6*

```
String rtn = (String)DAP.js.eval(DAP.js.escape(txt));
DAP.js.encodeURI(rtn);

DAP.win().setTimeout(js, 100);
int id = DAP.win().setInterval(AJsType.update, 10);
DAP.win().clearInterval(id);
```
702

```
var rtn=eval(escape(txt));
encodeURI(rtn);

window.setTimeout(js,100);
var id=window.setInterval(this.vj$.AJsType.update,10);
window.clearInterval(id);
```
704

*FIG. 7*

```
HtmlButton b = (HtmlButton)e.getTarget();
b.blur();
HtmlSpan span = DAP.docx.span();
span.setClassName("warn");
span.setInnerHTML("<b>Hi</b>");
Node msgArea = DAP.doc().getElementById("messageArea");
msgArea.getParentNode().insertBefore(span, msgArea);
```

802

```
var b=e.target || window.event.srcElement;
b.blur();
var span=document.createElement('span');
span.className="warn";
span.innerHTML="<b>Hi</b>";
var msgArea=document.getElementById("messageArea");
msgArea.parentNode.insertBefore(span,msgArea);
```

```
MyVjoType2 a = new MyVjoType2(); // native proxy
a.doIt2("test");
a.doIt2.call(a, "test");
a.doIt2.apply(new MyVjoType2(), new Object[]{"test"} );

MyVjoType2.doIt("test" );
MyVjoType2.doIt.call(MyVjoType2.prototype, "test");
```
— 902

```
var a=new this.vj$.MyVjoType2();
a.doIt2();
a.doIt2.call(a);
a.doIt2.apply(new this.vj$.MyVjoType2(),{'test'});

this.vj$.MyVjoType2.doIt("test");
this.vj$.MyVjoType2.doIt.call(this.vj$.MyVjoType2,false);
```
— 904

FIG. 9

METHOD AND SYSTEM FOR INTEGRATING JAVA AND JAVASCRIPT TECHNOLOGIES

TECHNICAL FIELD

This application relates to the technical fields of software and/or hardware technology and, in one example embodiment, to system and method for integrating Java™ and JavaScript™ technologies.

BACKGROUND

JavaScript™ is a scripting language that is used for client-side web development. Despite its name, and while designed to look like Java™, JavaScript™ is unrelated to the Java™ programming language. Rather, JavaScript™ is a dynamic, weakly typed, prototype-based language intended to be easier for non-programmers to work with. "JavaScript™" and "Java™" are trademarks of Sun Microsystems.

For a while now, JavaScript™ has been a de facto client-side scripting language for web pages. With the adoption of Web-2.0 for supporting rich client experience without sacrificing the easy accessibility of web application over WAN, the JavaScript™ programming in connection with cascading style sheets (CSS) and Markup language has become a focal point of many web-technology efforts.

BRIEF DESCRIPTION OF DRAWINGS

Embodiments of the present invention are illustrated by way of example and not limitation in the figures of the accompanying drawings, in which like reference numbers indicate similar elements and in which:

FIGS. 5-9 illustrate different JavaScript proxies and their respective corresponding JavaScript modules.

DETAILED DESCRIPTION

Figure 1:
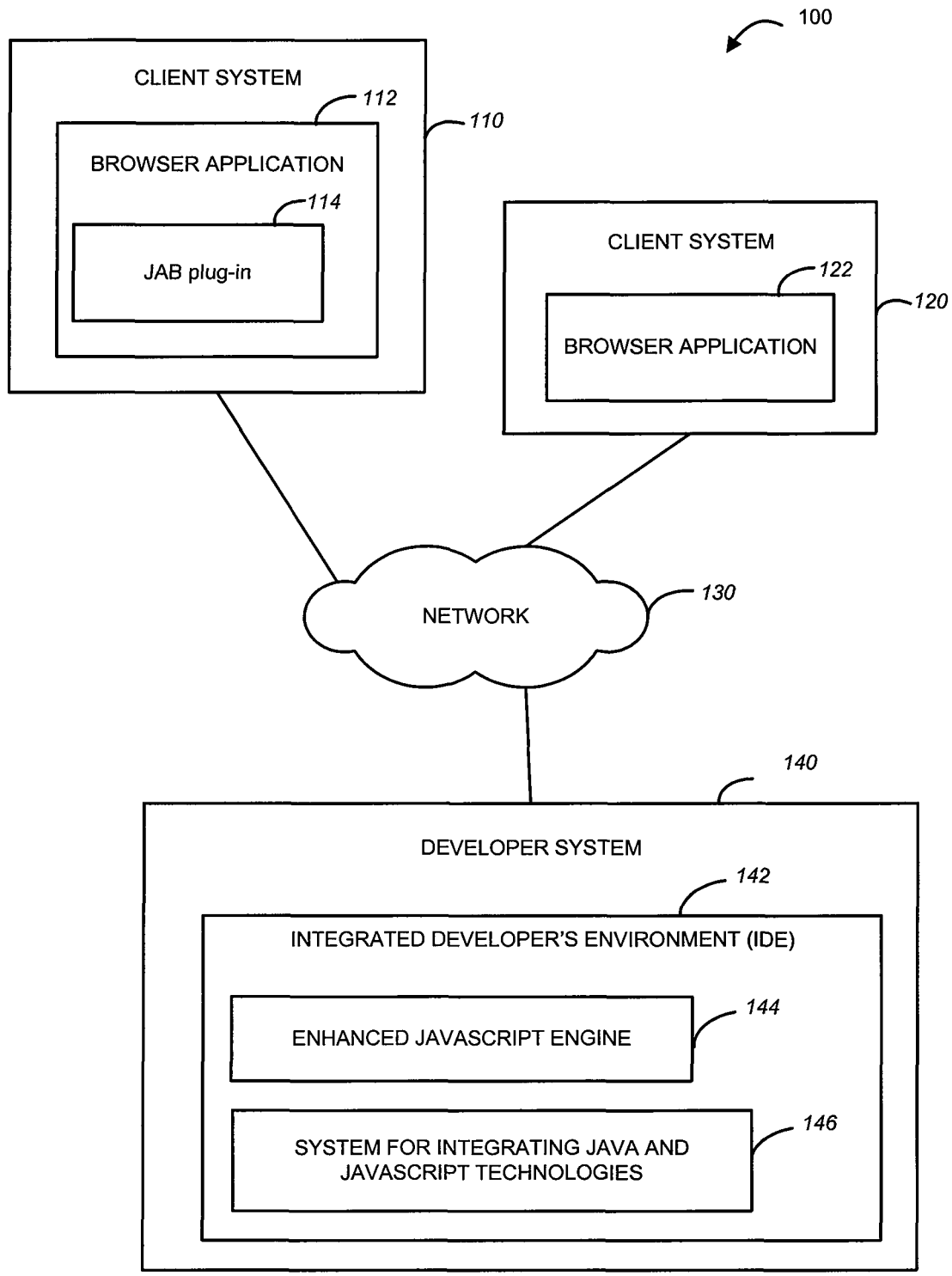
FIG. 1 is a diagrammatic representation of a network environment within which an example method and system may be implemented.

A method and system for integrating Java and JavaScript technologies are described. In the following description, for purposes of explanation, numerous specific details are set forth in order to provide a thorough understanding of an embodiment of the present invention. It will be evident, however, to one skilled in the art that the present invention may be practiced without these specific details. The method and system described herein may be utilized advantageously in the context of a unified presentation framework that provides active scripting environment for computing applications, such as, e.g., web applications.

A JavaScript engine may be provided with a developer's platform (e.g., Eclipse) to accommodate run time and authoring of applications in Java on the server side. Java and JavaScript are distinct programming languages that are both used in developing web applications. The difference between these two languages may be viewed as a barrier by those developers that are versed in one of these languages but not another. A method and system are provided to make this language barrier disappear by unifying them under the Java language such that Java code can reference JavaScript and vice versa. In one embodiment, the method and system may be implemented as an enhanced JavaScript engine for use with an integrated developer's environment (IDE) that permits authoring and debugging seamless Java/JavaScript code.

In one example embodiment, a JavaScript engine may be configured to cooperate with a build process or an IDE to generate automatically a typed Java application programming interface (API) for each authored JavaScript module. While JavaScript proxies are automatically generated for JavaScript modules created in an environment associated with an enhanced IDE, an external build system may be configured to also generate JavaScript proxies for all JavaScript types from an existing JavaScript library. A typed Java API generated for a JavaScript module may be termed a JavaScript proxy. A JavaScript proxy may be called from a Java module and may return a typed output. While a JavaScript proxy is automatically generated for JavaScript modules created in an environment associated with the enhanced JavaScript engine, the enhanced JavaScript engine may be configured to also generate a JavaScript proxy for a JavaScript module from an existing JavaScript library. In one example embodiment, when a third party JavaScript module is encountered, the enhanced JavaScript engine may first annotate the third party JavaScript module to create a definition for the third party JavaScript module, and then use the definition to generate a JavaScript proxy for the annotated third party JavaScript module.

As a JavaScript proxy may be implemented as a Java API, it can be called from a Java module during the execution of the Java module as any other Java API. The associated JavaScript is executed to create any object or method according to the JavaScript. It will be noted, that in this scenario the JavaScript is being executed on the server and may be run in a debug mode so that any debug statement in the JavaScript module can be viewed at the source of truth (i.e., at a location of a particular instruction in the JavaScript module that is being executed in a manner similar to an execution of a Java class).

An example method and system may be implemented in the context of a network environment 100 illustrated in FIG. 1.

As shown in FIG. 1, the network environment 100 may include client systems 110 and 120 and a server system 140. The server system 140, in one example embodiment, may host an integrated developer's environment (IDE) 142. The client systems 110 and 120 may run respective browser applications 112 and 122 and may have access to the server system 140 via a communications network 130. The communications network 130 may be a public network (e.g., the Internet, a wireless network, etc.) or a private network (e.g., a local area network (LAN), a wide area network (WAN), Intranet, etc.). The browser application 112 is shown as including a browser plug-in termed a "Java application in browser" or JAB plug-in 114. The JAB plug-in 114, in one example embodiment, facilitates running Java modules and a Java-based enhanced JavaScript engine inside the browser application 112, Java modules and a Java-based enhanced JavaScript engine to control the browser application 112 and to interact with the browser application 112.

The integrated developer's environment (IDE) 142, in one example embodiment, is equipped with an enhanced JavaScript engine 144. The enhanced JavaScript engine 144 may be Java-based and may be configured to facilitate integration of Java and JavaScript. The Java-based JavaScript engine 144, in one example embodiment, enables both Java and JavaScript modules to be executed and to interact with each other seamlessly inside a server-side Java application. An example system that may be provided as part of the IDE 142 is illustrated in FIG. 2.

Figure 2:
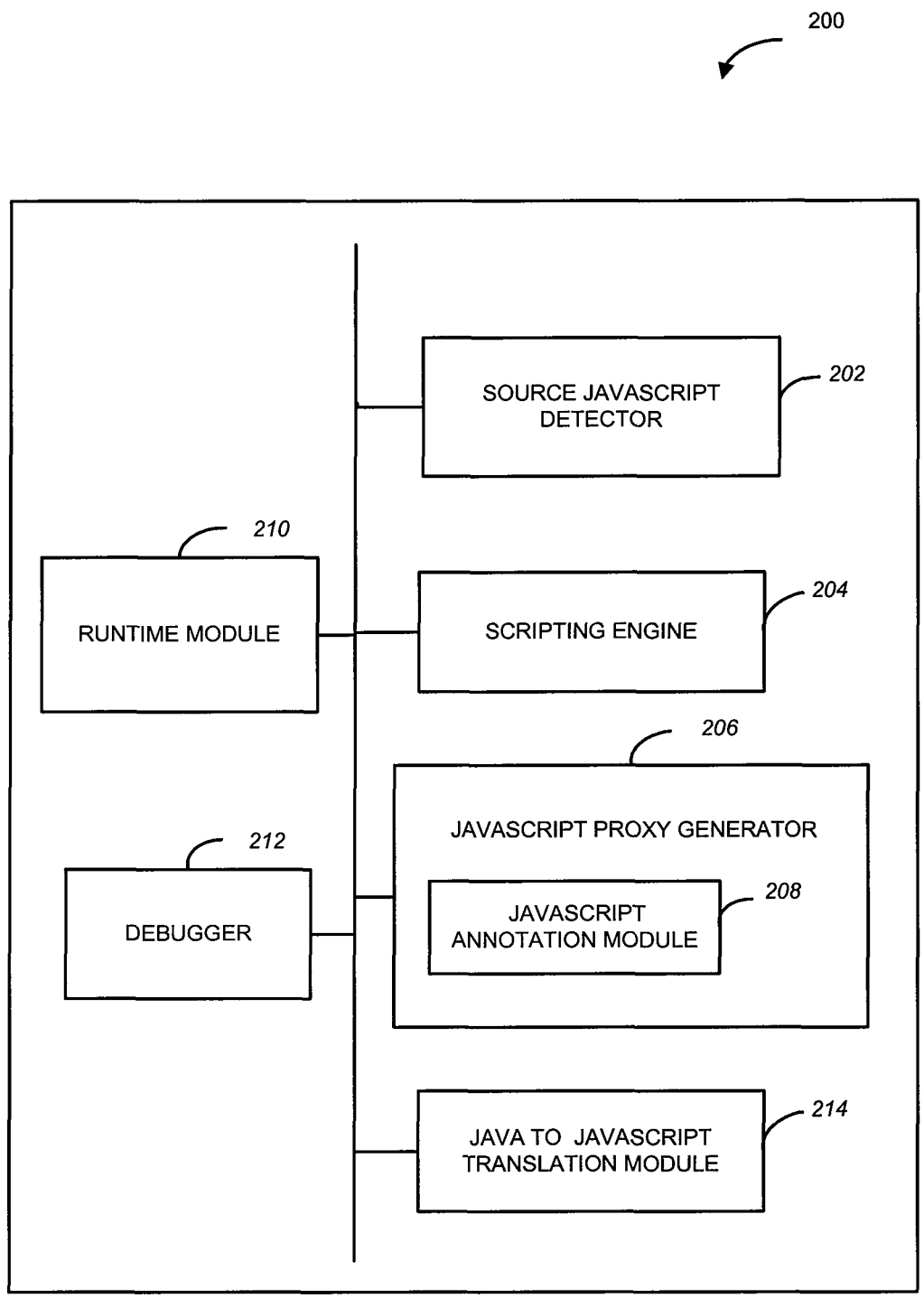
FIG. 2 is block diagram of a system for integrating Java and JavaScript technologies, in accordance with one example embodiment.

FIG. 2 is a block diagram of a system 200 for integrating Java and JavaScript technologies, in accordance with one example embodiment. As shown in FIG. 2, the system 200 includes a scripting engine 204, a source JavaScript detector 202, and a JavaScript proxy generator 206. The scripting engine 204 is configured to facilitate authoring of JavaScript modules and may include custom Java type loader and pluggable Java/JavaScript type converters. The source JavaScript detector 202 is configured to detect a newly authored JavaScript module and to provide an indication of the newly authored JavaScript module to the JavaScript proxy generator 206. The JavaScript proxy generator 206 may be configured to generate automatically a JavaScript proxy associated with the newly authored JavaScript module to permit accessing the associated JavaScript module from a Java module.

The JavaScript proxy generator 206 may be configured to generate automatically a JavaScript proxy for a third party JavaScript module. In one embodiment, the JavaScript proxy generator 206 includes a JavaScript annotation module 208. The JavaScript annotation module 208 may be configured to annotate the third party JavaScript module in order to create a definition for the third party JavaScript module, and then use the definition to generate a JavaScript proxy for the annotated third party JavaScript module.

The system 200 may further include a runtime module 210 configured to call a JavaScript proxy associated with a JavaScript module from a Java module and, responsive to the calling, pass control to the JavaScript module. The runtime module 210, in one embodiment is implemented as an executable in a JavaScript engine that provides Java-like object oriented type support, dynamic type loading, and ordered static type initialization. The runtime module 210 may then execute the JavaScript module and pass control to the Java module in order to continue execution of the Java module. A debugger 212 may also be provided with the system 200. The debugger 212 may be implemented as an integrated debugger for both Java and JavaScript modules to debug Java modules, as well as JavaScript modules accessed via the JavaScript proxy. Also shown in FIG. 2 is a Java to JavaScript translation module 214 configured to translate content of Java modules into JavaScript statements. An example method for integrating Java and JavaScript technologies can be described with reference to FIG. 3.

Figure 3:
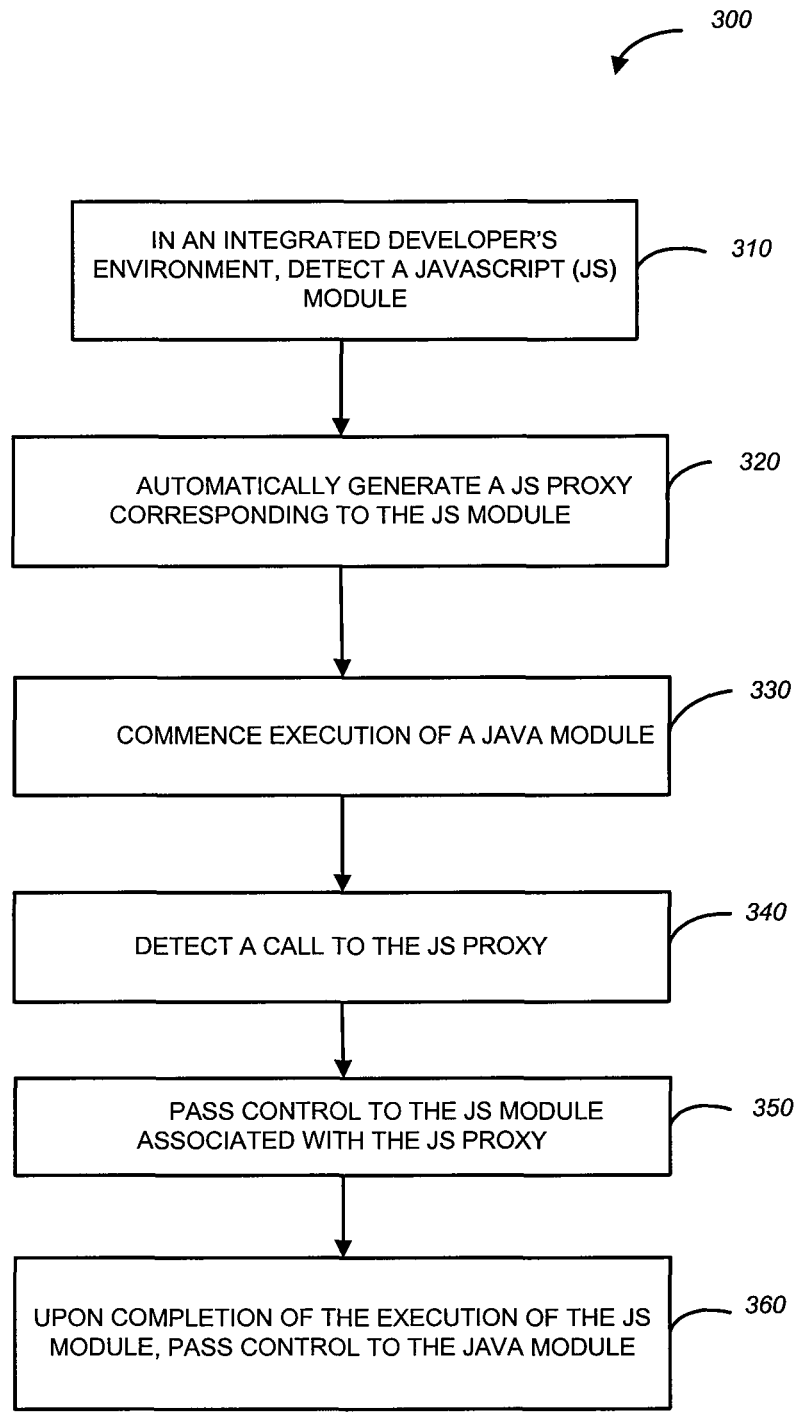
FIG. 3 is a flow chart of a method for integrating Java and JavaScript technologies, in accordance with an example embodiment.

FIG. 3 is a flow chart of a method 300 for integrating Java and JavaScript technologies, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 for integrating Java and JavaScript technologies shown in FIG. 2.

As shown in FIG. 3, the method 300 commences at operation 310, when the source JavaScript detector 202 of FIG. 2 detects a JavaScript module. At operation 320, the JavaScript proxy generator 206 of FIG. 2 automatically generates a JavaScript proxy corresponding to the JavaScript module. The generated JavaScript proxy may correspond, e.g., to a JavaScript object literal, to a JavaScript native array, to a native JavaScript function, to a JavaScript function created in a proprietary JavaScript-based language, or to a browser data object model (DOM). Examples of JavaScript proxies that correspond to various types of JavaScript modules are illustrated below in FIGS. 5-9.

Returning to FIG. 3, execution of a Java module that includes a call to a JavaScript proxy commences at operation 330. At operation 340, the runtime module 210 of FIG. 2 detects a call to the JavaScript proxy. The execution control is then passed to the JavaScript module that corresponds to the JavaScript proxy, at operation 350. After the instructions present in the JavaScript module are executed, the execution control is returned to Java module, at operation 360. A schematic diagram 400 of a Java module launching the execution of a JavaScript module (that may be viewed as corresponding to operations 340 and 350 is shown in FIG. 4.

Figure 4:
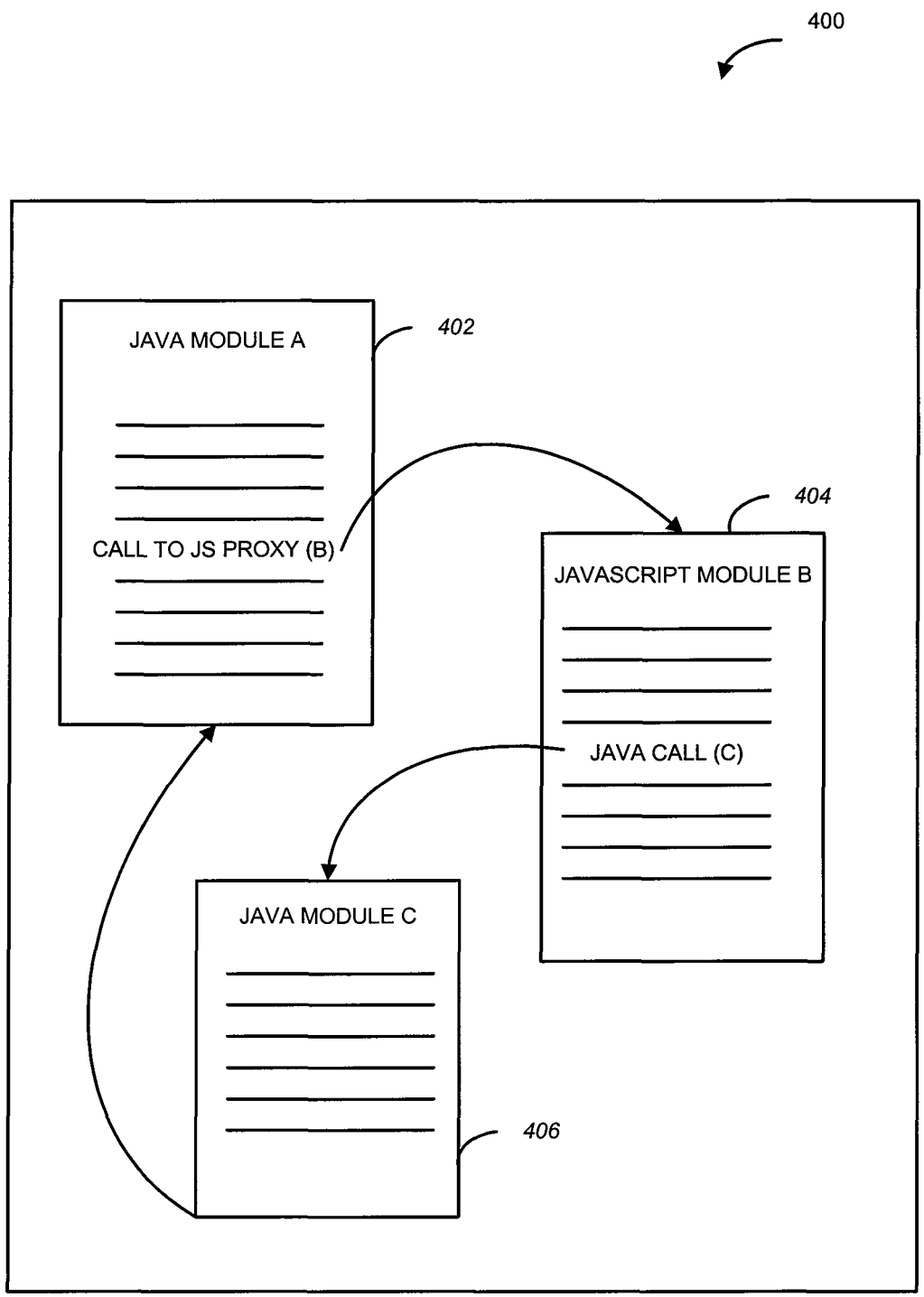
FIG. 4 is a schematic diagram of a Java module launching the execution of a JavaScript module, in accordance with an example embodiment.

As shown in FIG. 4, a Java module A (block 402) includes a call to a JavaScript proxy B. During the execution of the Java module A, when a call to the JavaScript proxy B is encountered, the execution control is passed to the JavaScript module B (block 404). The JavaScript module B is shown as including a call to a Java module C (block 406). When a call to the Java module C is encountered, the execution control is passed to the JavaScript module B. Upon completion of the execution of instructions present in the Java module C, the execution control is returned to the Java module A (block 402).

Figure 5:
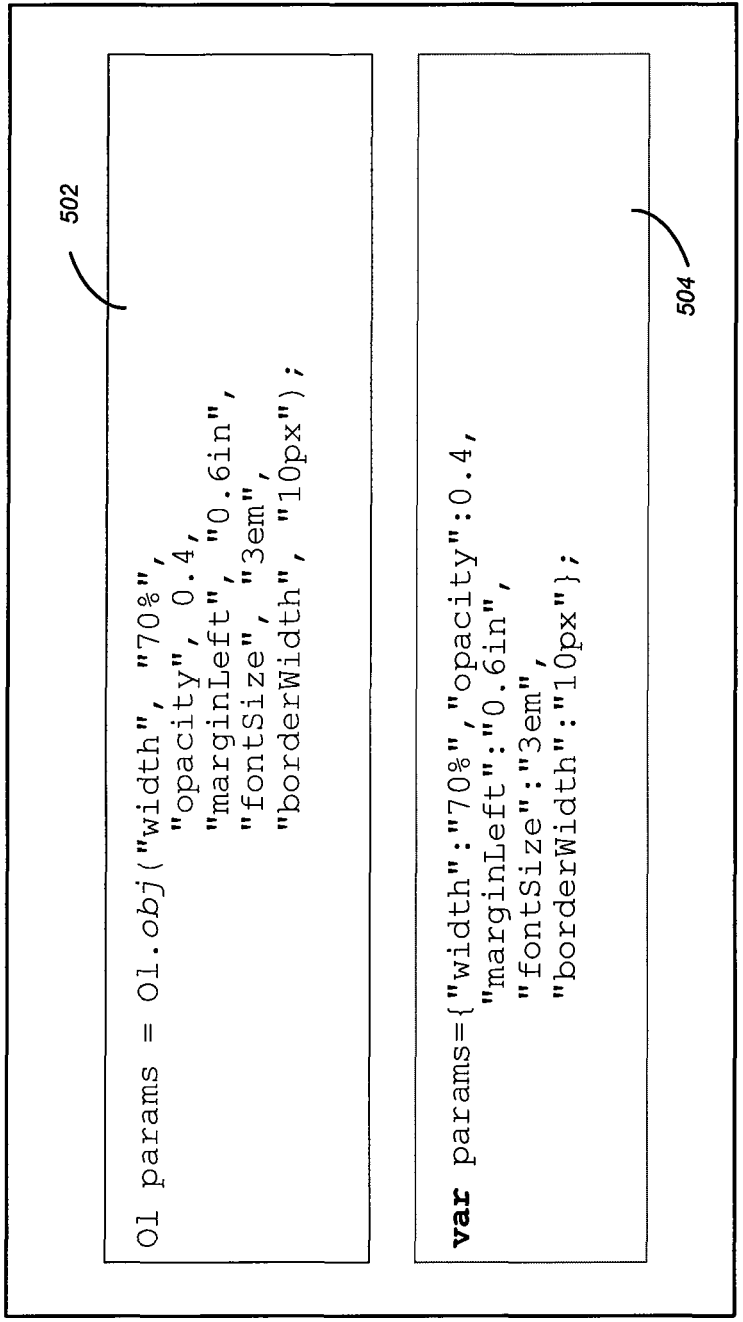

FIGS. 5-9 illustrate different JavaScript proxies and their respective corresponding JavaScript modules. In FIG. 5, the JavaScript proxy corresponding to a JavaScript object literal is shown in area 502, while the JavaScript object literal is shown in area 504. In FIG. 6, the JavaScript proxy corresponding to a JavaScript native array is shown in area 602, while the JavaScript native array is shown in area 604. In FIG. 7, the JavaScript proxy corresponding to a JavaScript native function is shown in area 702, while the JavaScript native function is shown in area 704. In FIG. 8, the JavaScript proxy corresponding to a JavaScript browser DOM function is shown in area 802, while the JavaScript browser DOM function is shown in area 804. In FIG. 9, a Java API corresponding to a JavaScript to a JavaScript function created in a proprietary JavaScript-based language is shown in area 902, while the JavaScript to a JavaScript function created in a proprietary JavaScript-based language is shown in area 904.

An example system for integrating Java and JavaScript technologies has been termed VJET. VJET blurs the language boundary between JavaScript and Java such that developers can code JavaScript using Java, JavaScript, or a combination of both, with complete interoperability. Described below are example modules that can be provided as part of VJET.

VJET Language Specification

To support the best of Java language features for JavaScript. VJET uses structural and comment/annotation-based type definition for bring in Java language concept to JavaScript, such as the concepts listed below.

package, imports
    class, interface, enum, abstract class, inner and anonymous
        class
    extends and implements
    generics
    static and instance formal constructors, properties and methods
static initialization
super and override
overloaded constructors and methods
modifiers: public, protected, private, final VJET Type System VJET type system includes various modules listed below.

VJET Parser handles VJET structural definition and VJET comment syntax, on top of JavaScript syntax.

VJET Abstract Syntax Tree (JST), analogous to Java AST, represents Java-like types and semantics in addition to JavaScript language constructs.

VJET Type Space Management supports the following example features.
  indexed type, hierarchy, reference and dependent search
  update, refactoring
  syntactic and semantic validation
  tool integration VJET Type Meta supports "reflection" for runtime typing which can be used for object serialization.

VJET JavaScript Runtime Library

VJET runtime bootstrap can be loaded in any standard JavaScript engine to enable VJET typed JavaScript. Some example features of the VJET JavaScript runtime library are listed below.
  analogous to Java ClassLoader for finding, loading and resolving JavaScript types
  supports dynamic type loading
  manages type resolution and initialization order based on type dependencies (including circular dependency)

VJET Java to JavaScript Translation Service
  Java to JavaScript—a full language translation
  supports most Java language features and object modeling semantics
  syntactical and structural resemblance
  semantic equivalence
  provides extension for custom translation VJET JavaScript to Java-API Translation Service VJET JavaScript to Java-API, in one embodiment, enables existing JavaScript to be accessed from Java naturally.
  produces Java API (NativeJsProxy) from VJET types authored in JavaScript
  exposes functional programming features to Java API, where function and type reference become first level programming constructs VJET JavaScript Library Integration VJET JavaScript Library integration provides support external type definition to integrate third-party non-VJET JavaScript library.
  external JavaScript Libraries are easily integrated
  VJET typing annotation provides non-intrusive way to integrate non-VJET JavaScript libraries
  no modifications needed for non-VJET JavaScript
  typed API becomes available for both JavaScript and Java VJET Core Java Library VJET core Java library is set of Java API for accessing JavaScript types and functions from Java language, such as JS global functions, JS native types (e.g., array, object literal, function), browser, DOM and convenient DOM operations, and functional programming extension. The functional programming extension may support the following features.
  function reference
  type reference
  hitch (function scope closure)
  curry (function arguments closure)

VJET JavaScript Library for JDK Types

All commonly used Java data types in JDK (Java Development Kit) have been made available in JavaScript by VJET via its Java-to-JavaScript translation.

VJET Enhanced JavaScript Engine

An enhanced execution environment to run and debug authored Java and JavaScript code in their native language form is provided. The custom Java type loader and pluggable Java/JavaScript type converters provided with VJET automatically bridge types and instances from two different languages. VJET enhanced scripting service supports interoperability between Java and JavaScript, and blurs the boundary between the Java and JavaScript languages. In Active Programming mode, Java types are loaded and executed in their authored forms (Java or JavaScript), while naturally interacting with other JavaScript types and objects. Under Active Programming mode, native JavaScript types can live in the Java space via proxies, and Java objects can live in the script space, with object identity preserved across language boundaries.

VJET Enhanced Unit Testing Framework

The interoperability of Java and JavaScript using VJET enables a seamless integration of Java Junit testing framework for JavaScript testing.

VJET Integrated Debugger

VJET integrated debugger is a fully unified debugger for both Java and JavaScript language. It provides seamless debugging across language boundary and permits developers to step in/out Java/JavaScript naturally in the same debugger session.

VJET Validation Module

Compiler-liked service to perform semantic validation for JavaScript files based on type-space and all enabled semantic validation rules.

VJET Aggregation Module

VJET Aggregation Module provides utility functions to produce aggregated JavaScript from those individual JavaScript definitions based on their type dependencies, without manual intervention.

VJET Integrated IDE

As most advanced Java IDEs, VJET IDE supports complete development environment for authoring, running, and debugging VJET JavaScript (authored in either Java or JavaScript language).

Java-to-JavaScript and JavaScript-to-Java-API translation services can be utilized beneficially to integrate with IDE to perform auto translation when source-of-truth was modified and saved, to integrate with build script to perform translation based on configuration control, and to perform on-the-fly translation in debug mode when the source code has been modified.

Third-party non-VJET library integration may be performed as separate step. For example, coded separate abstract VJET types may be coded to represent external types based their documentation or meta data definition. This step may be automated via, e.g., code generation tools if there is standard meta data definition, such as XML definition.

Via JavaNativeProxy, normal server-side application could also leverage existing client-side logic (written in JavaScript) in order to perform server-side logic.

In a traditional client-side JavaScript engine (such as e.g., a JavaScript engine that may reside in a browser), only JavaScript form will be presented, and Java code will be executed in its translated JavaScript form. In VJET extended JavaScript engine, a user may choose to run all code in JavaScript form (e.g., translated code from Java) or in the authored form (e.g., Java or JavaScript).

Below are some example Java modules that may be utilized in a system for integrating Java and JavaScript technologies.

Examples 1 and 2 below include Java code for Creating Java API from JavaScript. Example 1 shows a type definition for a Java API corresponding to a JavaScript module. Example 2 illustrates code generation of a Java native proxy from a JavaScript module, resulting in a JavaScript native proxy.

EXAMPLE 1

```
vjo.ctype("javaone.JavaScript.AJavaScriptType")
.protos({
    m__index: 0, //<int
    //>public void constructs(int)
    constructs: function(index) {
        this.m__index = index;
    },
    //>public void doit( )
    doit: function( ) {
        alert(this.m__index);
    }
})
.props({
    s__counter: 0, //<int
    //>public void update(boolean)
    update: function(increment) {
        alert(increment ? this.s__counter++ : this.s__counter--);
    }
})
.endType( );
```

EXAMPLE 2

```
public class AJavaScriptType extends NativeJavaScriptProxy {
    public AJavaScriptType(int index) {
        super(index);
    }
    public static void update(boolean increament) {
        callStatic(increament);
    }
    public void doit( ) {
        call( );
    }
    public static final NativeJavaScriptTypeRef<AJavaScriptType>
prototype
        = NativeJavaScriptTypeRef.get(AJavaScriptType.class);
    public static final
INativeJavaScriptFuncProxy<NativeJavaScriptType-
Ref<AJavaScriptType>>
        update = NativeJavaScriptFuncProxy.create(prototype, "update");
    public final INativeJavaScriptFuncProxy<AJavaScriptType> doit
        = NativeJavaScriptFuncProxy.create(this, "doit");
}
```

Examples 3 and 4 below illustrate extension techniques for functional programming that integrate JavaScript modules and Java modules.

EXAMPLE 3

```
package javaone.func;
import javaone.JavaScript.AJavaScriptType;
```

-continued

```
public class FunctionalP {
    public static void foo( ) {
        AJavaScriptType a = new AJavaScriptType(101);
        a.doit( );
        a.doit.call(a);
        a.doit.apply(new AJavaScriptType(202), null);
        AJavaScriptType.update(true);
        AJavaScriptType.update.call(AJavaScriptType.prototype,
false);
    }
}
```

EXAMPLE 4

```
vjo.ctype('javaone.func.FunctionalP') //< public
.needs(['javaone.JavaScript.AJavaScriptType'])
.props({
    //> public void foo( )
    foo:function( ){
        var a=new this.vj$.AJavaScriptType(101);
        a.doit( );
        a.doit.call(a);
        a.doit.apply(new this.vj$.AJavaScriptType(202),null);
        this.vj$.AJavaScriptType.update(true);
        this.vj$.AJavaScriptType.update.call(this.vj$.AJavaScriptType,false);
    }
})
.endType( );
```

Examples 5 and 6 below illustrate accessing native JavaScript functions.

EXAMPLE 5

```
package javaone.func;
import javaone.JavaScript.AJavaScriptType;
import com.ebay.dsf.dap.api.util.DAP;
public class JavaScriptGlobal {
    public static String foo(String txt) {
        Sting rtn =
(String)JavaScript.eval(JavaScript.escape(txt));
        return JavaScript.encodeURI(rtn);
    }
    public static void defer(String JavaScript) {
        win( ).setTimeout(JavaScript, 100);
        int id = win( ).setInterval(AJavaScriptType.update, 10);
        win( ).clearInterval(id);
    }
}
```

EXAMPLE 6

```
vjo.ctype('javaone.func.JavaScriptGlobal') //< public
.needs('javaone.JavaScript.AJavaScriptType')
.props({
    //> public String foo(String txt)
    foo:function(txt){
        var rtn=eval(escape(txt));
        return encodeURI(rtn);
    },
    //> public void defer(String JavaScript)
    defer:function(JavaScript){
        window.setTimeout(JavaScript,100);
```

```
    var id=window.setInterval(this.vj$.AJavaScriptType.update,10);
    window.clearInterval(id);
  }
})
.endType( );
```

Examples 7 and 8 below illustrate accessing a browser document object model (DOM).

EXAMPLE 7

```
package javaone.dom;
import com.ebay.dsf.dap.api.util.DAP;
import com.ebay.dsf.JavaScriptnative.HtmlButton;
import com.ebay.dsf.JavaScriptnative.HtmlSpan;
import com.ebay.dsf.JavaScriptnative.Node;
import com.ebay.dsf.JavaScriptnative.events.MouseEvent;
public class DomP {
    public static boolean myOnclick(MouseEvent e) {
        HtmlButton b = (HtmlButton)e.getTarget( );
        b.blur( );
        HtmlSpan span = DAP.docx.span( );
        span.setClassName("warn");
        span.setInnerHTML("<b>Hi</b>");
        Node msgArea = DAP.doc( ).getElementById("messageArea");
        msgArea.getParentNode( ).insertBefore(span, msgArea);
        return true;
    }
}
```

EXAMPLE 8

```
vjo.ctype('javaone.dom.DomP') //< public
.props({
    //> public boolean myOnclick(MouseEvent e)
    myOnclick:function(e){
        var b=e.target || window.event.srcElement;
        b.blur( );
        var span=document.createElement('span');
        span.className="warn";
        span.innerHTML="<b>Hi</b>";
        var msgArea=document.getElementById("messageArea");
        msgArea.parentNode.insertBefore(span,msgArea);
        return true;
    }
})
.endType( );
```

The Java code examples reproduced above may be run and debugged in their current form utilizing the enhanced JavaScript engine in an IDE. The Java code reproduced above can interact with native JavaScript objects seamlessly. Those Java objects can be created and accessed by either JavaScript code or Java code.

The techniques described herein, in some embodiments, may be used advantageously to provide strongly-typed API for accessing native JavaScript objects and functions, as well as execution and debugging environment to run Java code and JavaScript code with a blurred language boundary.

Figure 10:
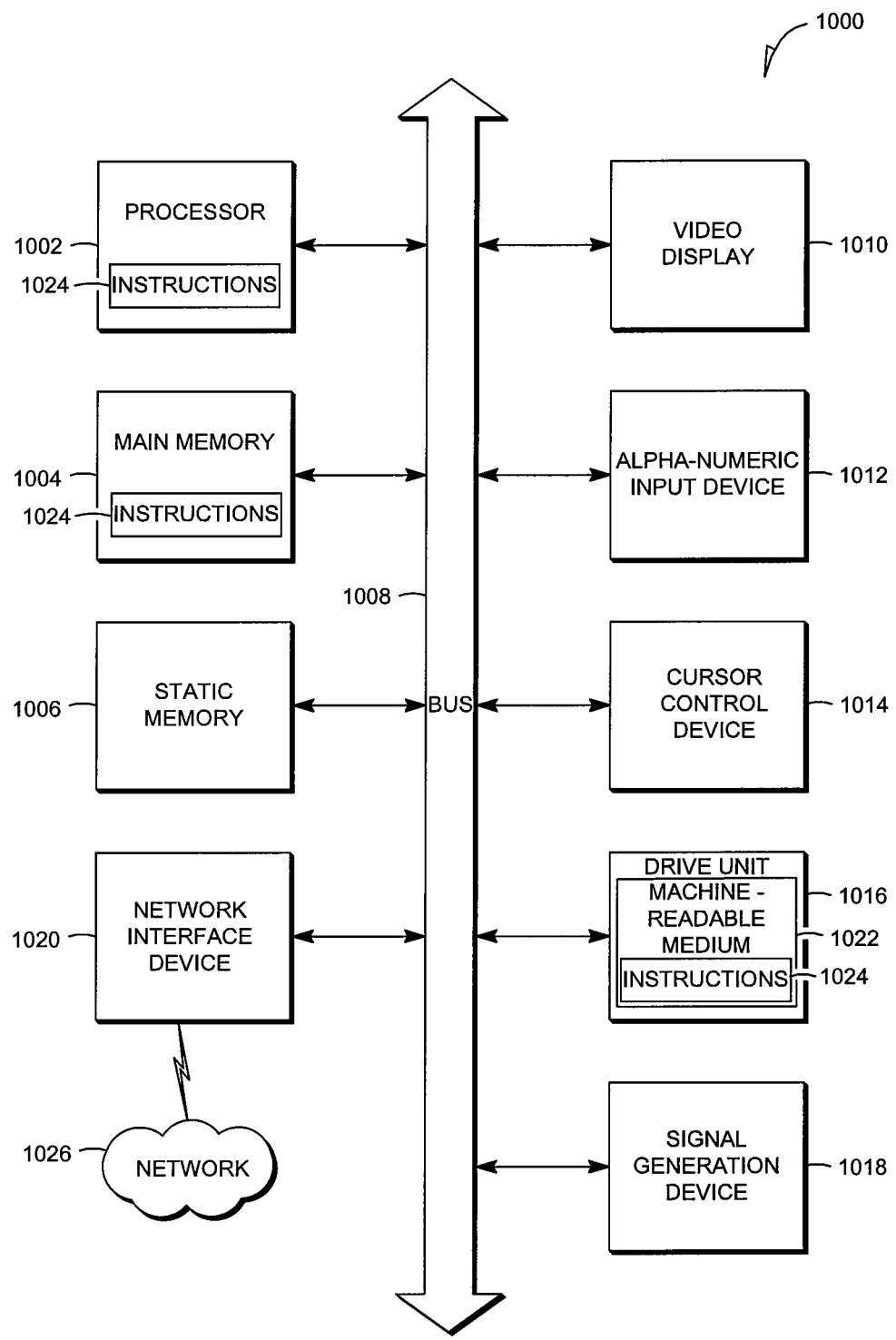
FIG. 10 is a diagrammatic representation of an example machine in the form of a computer system within which a set of instructions, for causing the machine to perform any one or more of the methodologies discussed herein, may be executed.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a user interface (UI) navigation device 1014 (e.g., a cursor control device), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, with the main memory 1004 and the processor 1002 also constituting machine-readable media.

The software 1024 may further be transmitted or received over a network 1026 via the network interface device 1020 utilizing any one of a number of well-known transfer protocols (e.g., Hyper Text Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for integrating Java and JavaScript technologies has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A computer-implemented system comprising:
a JavaScript proxy generator to automatically generate a JavaScript proxy in a form of a Java application programming interface (API), the JavaScript proxy associated with a JavaScript module, wherein the JavaScript proxy generator comprises a JavaScript annotation module to create a definition for the JavaScript module and a scripting engine to generate the JavaScript proxy using the definition; and
a runtime module to:
call the JavaScript proxy from the Java module;
responsive to the calling, pass control of execution to the JavaScript module;
execute the JavaScript module to generate an output method or object; and
pass control of execution to the Java module to continue execution of the Java module.

2. The system of claim 1, comprising a wherein the scripting engine is to facilitate authoring of the JavaScript proxy.

3. The system of claim 1, wherein, the JavaScript proxy is associated with a typed output.

4. The system of claim 1, wherein the JavaScript proxy is to access an object literal.

5. The system of claim 1, wherein the JavaScript proxy is to access a JavaScript native array.

6. The system of claim 1, wherein the JavaScript proxy is to access a native JavaScript function.

7. The system of claim 1, wherein the JavaScript proxy is to access a browser document object model (DOM).

8. The system of claim 1, comprising a debugger to debug the JavaScript module accessed via the JavaScript proxy.

9. The system of claim 1, wherein the system is integrated with an Integrated Developer's Environment (IDE).

10. A computer-implemented method comprising:
using one or more processors to perform operations of:
automatically generating a JavaScript proxy associated with a JavaScript module, the JavaScript proxy implemented as a Java API, wherein the generating of the JavaScript proxy comprises:
creating a definition for the JavaScript module, and
using the definition for the generating of the JavaScript proxy; calling the JavaScript proxy from a Java module;
responsive to the calling, passing control of execution to the JavaScript module;
executing the JavaScript module to generate an output method or object; and
passing control of execution to the Java module to continue execution of the Java module.

11. The method of claim 10, wherein the generating of the JavaScript proxy is associated with authoring of the JavaScript module.

12. The method of claim 10, wherein the JavaScript proxy is associated with a typed output.

13. The method of claim 10, wherein the JavaScript proxy is to access an object literal.

14. The method of claim 10, wherein the JavaScript proxy is to access a JavaScript native array.

15. The method of claim 10, wherein the JavaScript proxy is to access a native JavaScript function.

16. The method of claim 10, wherein the JavaScript proxy is to access a browser document object model (DOM).

17. The method of claim 10, wherein the executing of the JavaScript is performed in a debugging environment.

18. A machine-readable non-transitory storage medium having instruction data to cause a machine to:
automatically generate a JavaScript proxy in a form of a Java application programming interface (API), the JavaScript proxy associated with a JavaScript module, wherein the generating of the JavaScript proxy comprises:
creating a definition for the JavaScript module, and
using the definition for the generating of the JavaScript proxy;
call the JavaScript proxy from the Java module;
responsive to the calling, pass control of execution to the JavaScript module;
execute the JavaScript module to generate an output method or object; and
pass control of execution to the Java module to continue execution of the Java module.

* * * * *

UNITED STATES PATENT AND TRADEMARK OFFICE
CERTIFICATE OF CORRECTION

| | |
|---|---|
| PATENT NO. | : 8,572,554 B2 |
| APPLICATION NO. | : 12/505406 |
| DATED | : October 29, 2013 |
| INVENTOR(S) | : Yao et al. |

Page 1 of 1

It is certified that error appears in the above-identified patent and that said Letters Patent is hereby corrected as shown below:

In the Claims

In column 11, line 26, in Claim 2, before "wherein", delete "comprising a", therefor In column 11, line 28, in Claim 3, delete "wherein," and insert --wherein--, therefor In column 12, line 5, in Claim 10, after "proxy;", insert --¶--, therefor Signed and Sealed this
Twenty-sixth Day of August, 2014

Michelle K. Lee
*Deputy Director of the United States Patent and Trademark Office*